United States Patent
Gokarn et al.

(10) Patent No.: US 10,743,105 B1
(45) Date of Patent: Aug. 11, 2020

(54) SENDING AUDIO TO VARIOUS CHANNELS USING APPLICATION LOCATION INFORMATION

(71) Applicant: Microsoft Technology Licensing, LLC, Redmond, WA (US)

(72) Inventors: Arthi Gokarn, Kirkland, WA (US); Kishore Arvind Kotteri, Sammamish, WA (US); Firoz Dalal, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/428,430

(22) Filed: May 31, 2019

(51) Int. Cl.
*H04R 3/12* (2006.01)
*H04R 29/00* (2006.01)

(52) U.S. Cl.
CPC ............ *H04R 3/12* (2013.01); *H04R 29/002* (2013.01); *H04R 2430/01* (2013.01)

(58) Field of Classification Search
CPC .... H04R 3/12; H04R 29/002; H04R 2430/01; H04R 5/02; H04R 2499/15; H04N 5/642; H04S 1/002; H04S 3/00; G06F 1/1605; G06F 3/0489; H03G 7/007; H03G 3/001; H03G 3/002; H03G 3/00; H03G 3/32; H03G 3/3005; H03G 3/3089; H03G 1/0088; H03G 1/02; H03F 1/0211; H04H 30/04; G10H 3/186
USPC .................................. 381/107, 104, 105, 306
See application file for complete search history.

(56) References Cited

U.S. PATENT DOCUMENTS

| | | | |
|---|---|---|---|
| 8,068,925 B2 | 11/2011 | McKillop et al. | |
| 8,166,287 B2 | 4/2012 | Bear et al. | |
| 8,941,710 B2 | 1/2015 | Huitema et al. | |
| 9,584,948 B2 * | 2/2017 | Yeo | H04S 7/302 |
| 9,652,196 B2 | 5/2017 | Davis et al. | |
| 9,794,718 B2 | 10/2017 | Crockett et al. | |
| 9,898,250 B1 * | 2/2018 | Williams | G06F 3/167 |
| 10,212,516 B1 * | 2/2019 | Kallali Narayana | H04S 7/303 |
| 2012/0054613 A1 * | 3/2012 | Yoo | G06F 3/165 |
| | | | 715/716 |

(Continued)

FOREIGN PATENT DOCUMENTS

| | | |
|---|---|---|
| EP | 3142389 A1 | 3/2017 |
| WO | 2009140794 A1 | 11/2009 |

*Primary Examiner* — Ahmad F. Matar
*Assistant Examiner* — Sabrina Diaz
(74) *Attorney, Agent, or Firm* — Ray Quinney & Nebeker; Tiffany Healy (57) ABSTRACT

Methods and devices for panning audio may include receiving audio data from an application open on at least one display device of a plurality of display devices in communication with a computer device. The methods and devices may include selecting a set of speakers from a plurality of speakers of the plurality of display devices to receive the audio data in response to speaker location information and application location information with a current location for the application. The methods and devices may include receiving updated application location information with a new location for the application and selecting a new set of speakers from the plurality of speakers to receive the audio data in response to the new location for the application. The methods and devices may include transitioning the audio data from the set of speakers to the new set of speakers.

20 Claims, 6 Drawing Sheets

(56) References Cited

U.S. PATENT DOCUMENTS

| | | | |
|---|---|---|---|
| 2014/0331135 A1* | 11/2014 | Sukoff | H04L 65/60 |
| | | | 715/719 |
| 2015/0256954 A1* | 9/2015 | Carlsson | H04R 27/00 |
| | | | 381/59 |
| 2017/0031530 A1* | 2/2017 | Ikeda | H04N 5/74 |
| 2017/0064383 A1* | 3/2017 | Yu | H04N 21/4316 |
| 2018/0335903 A1* | 11/2018 | Coffman | G06F 3/0414 |
| 2019/0110097 A1* | 4/2019 | Schorr | H04N 21/4788 |
| 2019/0306561 A1* | 10/2019 | Xu | G06F 3/0486 |
| 2019/0320219 A1* | 10/2019 | Yoden | H04N 21/42204 |
| 2020/0092221 A1* | 3/2020 | Sukoff | H04L 63/10 |

* cited by examiner

SENDING AUDIO TO VARIOUS CHANNELS USING APPLICATION LOCATION INFORMATION

BACKGROUND

The present disclosure relates to sending audio across a plurality of speakers.

When a plurality of devices are in communication with a computer device, there may be a plurality of speakers that may output audio for an application. As such, depending on where the application may be located, speakers of the devices may need to be selected to output the audio. Moreover, as new applications are opened, the selected speakers may need to be updated for the various applications.

Thus, there is a need in the art for improvements in sending audio across a plurality of speakers.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, at least one processor configured to communicate with the memory, and an operating system configured to communicate with the memory and the processor, wherein the operating system is operable to: receive audio data from an application open on at least one display device of a plurality of display devices in communication with the computer device; select a set of speakers from a plurality of speakers of the plurality of display devices to receive the audio data in response to speaker location information for the plurality of speakers and application location information with a current location for the application; receive updated application location information with a new location for the application; select a new set of speakers from the plurality of speakers to receive the audio data in response to the new location for the application and the speaker location information; and transition the audio data from the set of speakers to the new set of speakers.

Another example implementation relates to a method for panning audio across a plurality of speakers. The method may include receiving, at an operating system executing on the computer device, audio data from an application open on at least one display device of a plurality of display devices in communication with the computer device. The method may include selecting a set of speakers from a plurality of speakers of the plurality of display devices to receive the audio data in response to speaker location information for the plurality of speakers and application location information with a current location for the application. The method may include receiving updated application location information with a new location for the application. The method may include selecting a new set of speakers from the plurality of speakers to receive the audio data in response to the new location for the application and the speaker location information. The method may include transitioning the audio data from the set of speakers to the new set of speakers.

Another example implementation relates to computer-readable medium storing instructions executable by a computer device. The computer-readable medium may include at least one instruction for causing the computer device to receive audio data from an application open on at least one display device of a plurality of display devices in communication with the computer device. The computer-readable medium may include at least one instruction for causing the computer device to select a set of speakers from a plurality of speakers of the plurality of display devices to receive the audio data in response to speaker location information for the plurality of speakers and application location information with a current location for the application. The computer-readable medium may include at least one instruction for causing the computer device to receive updated application location information with a new location for the application. The computer-readable medium may include at least one instruction for causing the computer device to select a new set of speakers from the plurality of speakers to receive the audio data in response to the new location for the application and the speaker location information. The computer-readable medium may include at least one instruction for causing the computer device to transition the audio data from the set of speakers to the new set of speakers.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for panning audio for one or more applications across a plurality of speakers as a location of an application changes. Panning audio may include having the audio output for the applications by the speakers follow the movement of the applications as the locations of the applications change. As such, different speakers may be selected to output the audio for the applications as the locations of the applications changes. The devices and methods may include one or more display devices in communication with a computer device. The display devices may communicate with the computer device via a universal serial bus (USB), Bluetooth, and/or other network type. The display devices may have at least one display and a corresponding audio input and/or audio output. The display devices may be any type of display, monitor, visual presentation device, computer device, and/or physical panel capable of presenting information, capturing audio, and/or emitting audio. Each display device may include any number of channels (e.g., speakers and/or microphones) for capturing audio or emitting audio. Each speaker and/or microphone of the display devices may correspond to any number of channels. For example, the speakers and/or microphones may be two channel stereo with a left channel and a right channel. The audio stack on the computer device may receive information regarding the number of display devices in communication with the computer device and a number of speakers for each display device. The audio stack may also receive speaker location information for each speaker that provides a physical location for the speakers that may correspond to a static orientation of the speakers.

On a particular display device, there may be multiple windows and/or virtual panels corresponding to applications. A location of the applications may be shared with an audio stack on the computer device. The audio stack may determine the direction for panning the audio to speakers on a particular display device in response to a combination of the application location information, the display device information, and the speaker location information.

For example, when a media application plays audio and video, the audio for the media application may be output by speakers on the display device where the media application is currently located. Users may drag and/or expand the window size of applications to a new location so that the applications may span across multiple display devices. As applications move to a new location (e.g., to another display device or to another virtual panel or window of the same display device), the audio may be panned to a different set of speakers that correspond to the new location of the application. The audio stack may apply a weight to determine an amount of audio to output via a corresponding speaker. As the application moves, the audio stack may lower the amount of audio output by the speakers near a current location of the application (e.g., by lowering the weight) and increase the amount of audio output by the speakers near the new location of the application (e.g., by increasing the weight).

In addition, the audio stack may determine the direction for panning the audio to speakers on a particular display in response to other auxiliary information, such as, but not limited to, user location, triggering a change in direction for the audio. For example, when a user is located in a room, the audio may be output by speakers on the display devices in the room where the user is located. As the user moves to a different location (e.g., to a new room and/or to a different area of the room), the audio may be panned to a different set of speakers that correspond to the new location of the user. Another example may include audio stack selecting a set of speakers to output the audio that may have a shortest distance to the user location relative to the distance of other speakers to the user location.

As such, the methods and devices may allow applications to spread across multiple displays, bringing a whole new dimension to collaborative and productive work. The methods and devices may intelligently move audio to a speaker configuration by making decisions internally where to send audio so that a user and/or application does not have to make any of the decisions.

Figure 1:
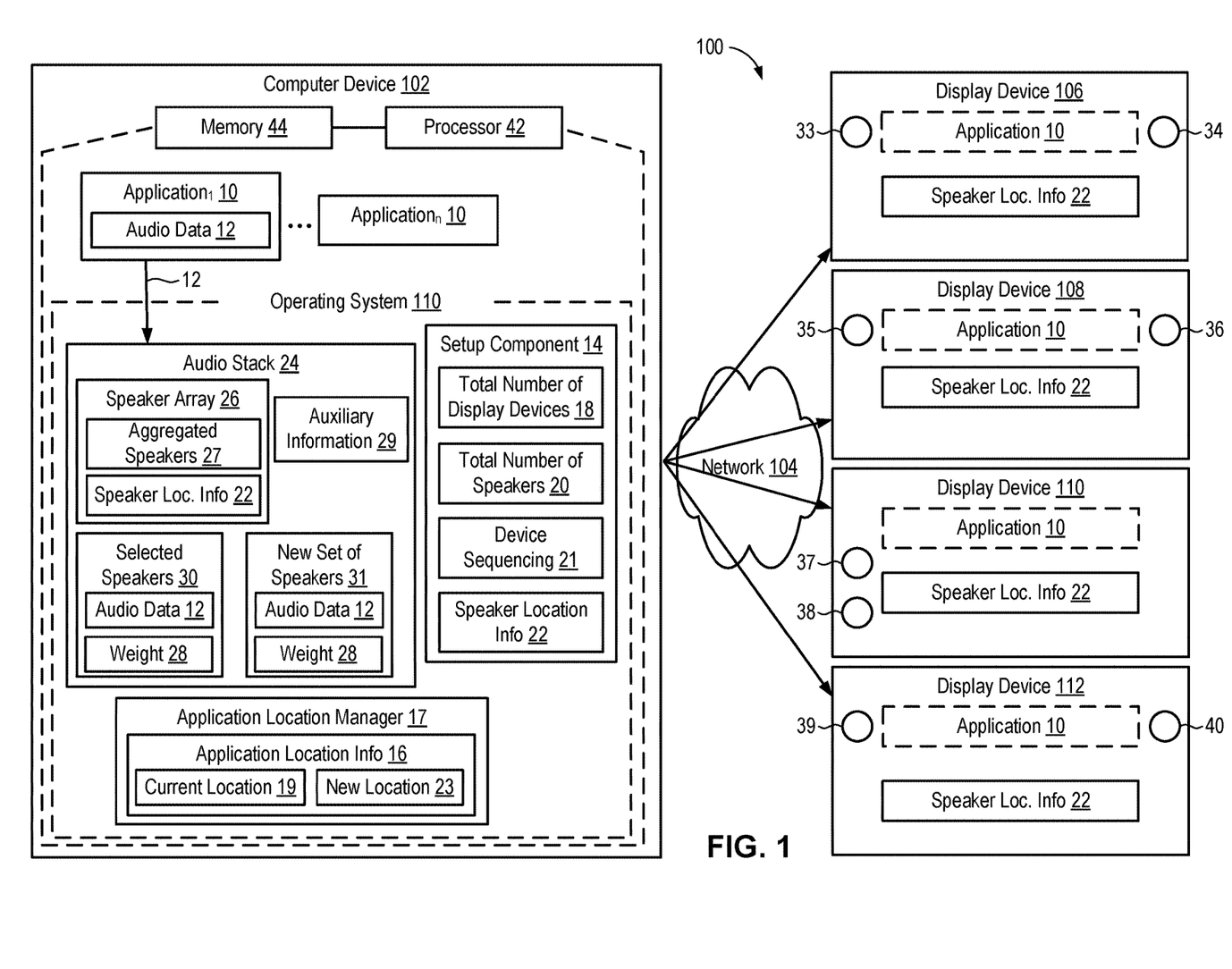
FIG. 1 is a schematic block diagram of an example computer device in communication with a plurality of display devices in accordance with an implementation of the present disclosure.

Referring now to FIG. 1, a system 100 for use with panning audio may include a computer device 102 in communication with a plurality of display devices 106, 108, 110, 112 via a wired or wireless network 104. For example, display devices 106, 108, 110, 112 may communicate with the computer device 102 via a universal serial bus (USB) or other network type. The plurality of display devices 106, 108, 110, 112 may be any type of display, monitor, visual presentation device, computer device, and/or physical panel capable of presenting information, capturing audio, and/or emitting audio. In addition, each display device 106, 108, 110, 112, may include any number of channels for capturing audio and/or emitting audio. Each speaker and/or microphone of display devices 106, 108, 110, 112 may correspond to any number of channels.

The plurality of display devices 106, 108, 110, 112 may be combined together and represented as a single audio endpoint so that applications 10 may be unaware of the plurality of display devices 106, 108, 110, 112 in communication with computer device 102. Applications 10 executing on computer device 102 may be used on any one of display devices 106, 108, 110, 112. Applications 10 may be spread across multiple display devices 106, 108, 110, 112 without being constrained to a single display device 106, 108, 110, 112. On a particular display device 106, 108, 110, 112, there may be multiple windows and/or virtual panels that may correspond to one or more applications 10. For example, applications 10 may have a graphical user interface (UI) that corresponds to a window on a display device 106, 108, 110, 112. As such, a whole new dimension to collaborative and productive work may be created using system 100.

Computer device 102 may include any mobile or fixed computer device, which may be connectable to a network. Computer device 102 may be, for example, a computer device such as a desktop or laptop or tablet computer, an internet of things (IOT) device, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 102 may include an operating system 111 that may be executed by processor 42 and/or memory 44. Memory 44 of computer device 102 may be configured for storing data and/or computer-executable instructions defining and/or associated with operating system 111, and processor 42 may execute such data and/or instructions to instantiate operating system 111. An example of memory 44 can include, but is not limited to, a type of memory usable by a computer, such as random access memory (RAM), read only memory (ROM), tapes, magnetic discs, optical discs, volatile memory, non-volatile memory, and any combination thereof. An example of processor 42 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 111 may include a setup component 14 that may initialize and/or configure system 100. For example, setup component 14 may determine a total number of display devices 18 in communication with computer device 102. For example, the total number of display devices 18 may be predetermined by a user of computer device 102 and/or user input may be received via, for example, a user interface of a display on computer device 102 indicating the total number of display devices 18 for system 100. As display devices are added and/or removed from system 100, the total number of display devices 18 may increase and/or decrease as necessary.

Setup component 14 may also determine a total number of speakers 20 in system 100. Each display device 106, 108, 110, 112 may provide information regarding a number of speakers on display devices 106, 108, 110, 112 and the corresponding speaker location information 22 for each speaker on display devices 106, 108, 110, 112. For example, setup component 14 may receive hardware information from each of the display devices 106, 108, 110, 112 that identifies how many speakers display devices 106, 108, 110, 112 may have, the speaker location information 22, how many channels display devices 106, 108, 110, 112 may support, whether display devices 106, 108, 110, 112 may be a high speed device or super speed device, how many audio rendering endpoints display devices 106, 108, 110, 112 may have, how many capture endpoints display devices 106, 108, 110, 112 may have, and/or any hardware loopback points on display devices 106, 108, 110, 112. Setup component 14 may capture the hardware information of the display devices 106, 108, 110, 112 and may build a topology for system 100 in response to the information learned from the display devices 106, 108, 110, 112.

Setup component 14 may determine a total number of speakers 20 in the system by adding the number of speakers on each display device 106, 108, 110, 112. For example, display device 106 may include speakers 33, 34 that supports two channels (e.g., right and left). Display device 108 may include speakers 35, 36 that supports two channels (e.g., right and left). Display device 110 may include speakers 37, 38 that supports two channels (e.g., right and left). Display device 112 may include speakers 39, 40 that supports two channels (e.g., right and left). As such, the total number of speakers 20 may be eight.

Setup component 14 may also determine speaker location information 22 that identifies a physical location of the speakers 33, 34, 35, 36, 37, 38, 39, 40. The speaker location information 22 may correspond to a static orientation of the speakers 33, 34, 35, 36, 37, 38, 39, 40 on each of the display devices 106, 108, 110, 112. As such, the speaker location information 22 may indicate which display device 106, 108, 110, 112 speakers 33, 34, 35, 36, 37, 38, 39, 40 are located on and/or a certain area of such location (e.g., top (left/center/right), bottom (left/center/right), middle (left/center/right)). For example, the speaker location information 22 for speaker 33 of display device 106 may indicate that speaker 33 is located on the left side at the top of display device 106. The speaker location information for speaker 34 of display device 106 may indicate that speaker 34 is located on the right side at the top of display device 106.

The static orientation of the speaker location information 22 may also incorporate any rotations that may occur to display devices 106, 108, 110, 112. For example, if display device 106 is rotated vertically so that speaker 33 is now on the left side at the bottom of display device 106 and speaker 34 is now on the left side at the top of display device 106, the speaker location information 22 for speaker 33 may be updated to indicate that speaker 33 is located on the left side at the bottom of display device 106 and the speaker location information 22 for speaker 34 may be updated to indicate that speaker 34 is located on the left side at the top of display device 106.

In addition, setup component 14 may determine a device sequencing 21 that may apply an order to the display devices 106, 108, 110, 112. For example, the order may include display device 106 as a first display device, display device 108 as a second display device, display device 110 as a third display device, and display device 112 as a fourth display device. The device sequencing 21 may be used to apply an order to the speakers 33, 34, 35, 36, 37, 38, 39, 40 of the different display devices 106, 108, 110, 112.

Operating system 111 may also include an application location manager 17 that may provide application location information 16 for each application 10. The application location information 16 may indicate one or more display devices 106, 108, 110, 112 where application 10 may be currently located. In addition, on a particular display device 106, 108, 110, 112, there may be multiple windows and/or virtual panels that may correspond to one or more applications 10. For example, applications 10 may have a graphical user interface (UI) that corresponds to a window on a display device 106, 108, 110, 112. The application location information 16 may also include coordinates from, for example, a Cartesian coordinate system, that provide a pixel position of the current location 19 of applications 10 on the display devices 106, 108, 110, 112. As such, the application location information 16 may indicate a window and/or virtual panel on display devices 106, 108, 110, 112 where applications 10 may be located and may also provide a pixel position of a current location 19 of applications 10 on display devices 106, 108, 110, 112. As one or more applications 10 change locations to a new location 23, application location manager 17 may track the movement of applications 10 and may update the application location information 16 with the new locations 23 of applications 10 in response to the changes in location.

Operating system 111 may also include an audio stack 24 that may receive audio data 12 from one or more applications 10 and may select speakers 30 on one or more display devices 106, 108, 110, 112 to output the audio data 12. Audio stack 24 may receive information indicating a number of applications 10 open on display devices 106, 108, 110, 112 and the corresponding application location information 16 for each application 10. In addition, audio stack 24 may receive display device information including, but not limited to, the total number of display devices 18 in communication with computer device 102, the total number of speakers 20, the speaker location information 22, and the device sequencing 21 information. Audio stack 24 may use a combination of the application location information 16 and the speaker location information 22 in selecting the speakers 30 to receive the audio data 12. In addition, audio stack 24 may use other auxiliary information 29, such as, but not limited to, user location in selecting the speakers 30 to receive the audio data 12. The selected speakers 30 may be a subset of the total number of speakers 20. In addition, the selected speakers 30 may be the total number of speakers 20.

Audio stack 24 may maintain a relationship between the total number of speakers 20 in the system and the corresponding speaker location information 22. For example, audio stack 24 may create a speaker array 26 with that combines the speakers 33, 34, 35, 36, 37, 38, 39, 40 from each display device 106, 108, 110, 112 using the device sequencing 21 information into an array of aggregated speakers 27. The aggregated speakers 27 may be the total number of speakers 20 in the system 100 or a subset of the total number of speakers 20. In addition, an order may be applied using the device sequencing 21 information when combing the speakers into the array of aggregated speakers 27.

In addition, speaker array 26 may include the corresponding speaker location information 22 for the aggregated speakers 27. Speaker array 26 may be dynamically updated as the number of speakers increases or decreases in system 100. In addition, speaker array 26 may be dynamically updated when a change occurs in speaker location information 22 (e.g., a display device rotates to a different orientation). As such, speaker array 26 may be used to maintain an association between the speakers 33, 34, 35, 36, 37, 38, 39, 40 of each display device 106, 108, 110, 112 and the corresponding speaker location information 22.

Audio stack 24 may use a combination of the application location information 16 and the display device information to select one or more speakers 30 of display devices 106, 108, 110, 112 to output the audio data 12 for applications 10. Audio stack 24 may use the speaker array 26 to select a subset of speakers 30 from the aggregated speakers 27 located nearby the current location 19 of application 10. The selected speakers 30 may be located nearby the current location 19 of application 10 when the physical location of the selected speakers 30 are located on the same display device 106, 108, 110, 112 as application 10. In addition, the selected speakers 30 may be located nearby the current location 19 of application 10 when a distance from the physical location of each speaker of the subset of speakers is within a predefined radius of application 10. For example, the selected speakers 30 may have a shortest distance relative to the distances of other speakers to the current location 19 of application 10.

In addition, audio stack 24 may also use other auxiliary information 29 to select one or more speakers 30 of display devices 106, 108, 110, 112 to output the audio data 12 for applications 10. Auxiliary information 29 may include, but is not limited to, user location information, changes in speaker location information 22 (e.g., when a display device is rotated), and/or any other triggers that may modify a direction of the audio output. For example, the selected speakers 30 may be closest to the user location instead of the application location so that the audio may be output close to the user. Audio stack 24 may use the other auxiliary information 29 in combination with the speaker location information 22 and/or the application location information 16.

One example may include when an application 10 located on display device 108 plays audio and a user is located nearby speaker 34 of display device 106 and speaker 35 of display device 108, audio stack 24 may select speakers 34, 35 as the selected speakers 30 to output the audio for application 10 because speakers 34, 35 may be the closest to the user location.

Another example may include when a media application 10 location on display device 106 plays audio and video, the audio for the media application 10 may be output by the selected speakers 30 of the display device 106 where the media application is currently located (e.g., speakers 33, 34). A user may drag and/or expand the window size of application 10 so that application 10 may span across multiple display devices (e.g., display devices 106, 108). As application 10 may move to a new location 23 (e.g., to another display device 108), the audio data 12 may be panned to a new set of selected speakers 31 (e.g., speakers 33, 34, 35, 36) that correspond to the new location 23 for application 10.

Audio stack 24 may receive the updated application location information 16 with the new location 23 for application 10. The updated application location information 16 may identify the display device(s) 106, 108, 110, 112 for the new location 23 of application 10. For example, application 10 may move to a new location 23 on the same display device 106, 108, 110, 112. In addition, application 10 may move to a new location 23 on a different display device 106, 108, 110, 112 and/or span across multiple display devices 106, 108, 110, 112. The updated application location information 16 may also include one or more coordinates from, for example, a Cartesian coordinate system, that provide a pixel position of the new location 23 of applications 10 on the display devices 106, 108, 110, 112.

Audio stack 24 may use the speaker array 26 to select a new set of speakers 31 from the aggregated speakers 27 located nearby the new location 23 of application 10. The new set of speakers 31 may be located nearby the new location 23 of application 10 when the physical location of the new set of speakers 31 are located on the same display device 106, 108, 110, 112 as application 10. In addition, the new set of speakers 31 may be located nearby the new location 23 of application 10 when a distance from the physical location of each speaker of the new set of speakers 31 is within a predefined radius of application 10.

Audio stack 24 may apply a weight 28 to determine an amount of audio data 12 to output via a corresponding selected speaker 30. The weight 28 may be determined in response to a distance a speaker may be from the current location 19 of application 10. A speaker close in distance to the current location 19 of application 10 may receive a higher weight 28 relative to a speaker located further away from the current location 19 of application 10. For example, the weight 28 may indicate an amount of volume to output from the selected speakers 30, where a lower number may result in a lower volume and a higher number may result in a higher volume. As application 10 moves to a new location 23, audio stack 24 may lower the weight 28 applied to the selected speakers 30 near the current location 19 of application 10 so that a volume of audio data 12 output by the selected speakers 30 may be reduced. Audio stack 24 may increase the weight 28 applied to the selected speakers 30 near the new location 23 so that the volume of audio data 12 output by the new set of selected speakers 30 near the new location 23 of application 10 may increase. As such, audio stack 24 may ensure that the output of the audio data 12 follows the movement of application 10 to the new location 23.

Audio stack 24 may intelligently pan audio to a speaker configuration as applications move locations by making decisions internally where to send audio so that a user and/or application does not have to make any of the decisions. As such, as applications may spread across multiple displays, bringing a whole new dimension to collaborative and productive work, the audio for the applications may pan to different speaker configurations following the movement of the applications.

Figure 2:
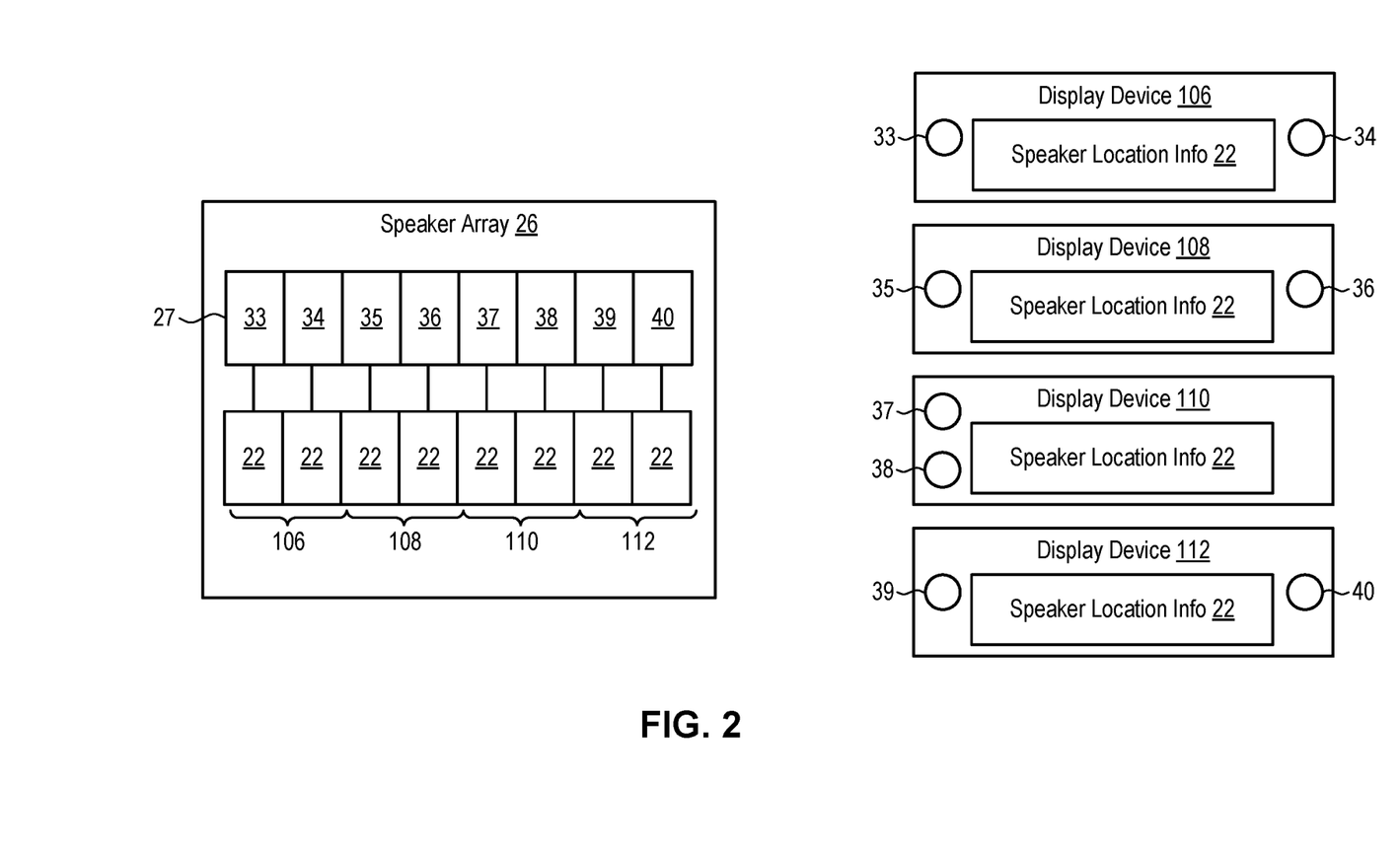
FIG. 2 is an example of a speaker array in accordance with an implementation of the present disclosure.

Referring now to FIG. 2, an example speaker array 26 of aggregated speakers 27 is illustrated. For example, speaker array 26 may combine the speakers 33, 34, 35, 36, 37, 38, 39, 40 into a single array of aggregated speakers 27. Speakers 33, 34, 35, 36, 37, 38, 39, 40 may be combined together using the device sequencing 21 information. The device sequencing 21 may apply an order to display devices 106, 108, 110, 112. For example, display device 106 may be the first display device, display device 108 may be the second display device, display device 110 may be the third display device, and display device 112 may be the fourth display device. As such, speakers 33, 34, 35, 36, 37, 38, 39, 40 may be combined using the order of the device sequencing 21.

For example, display device 106 speakers 33, 34 may be placed first into the array of aggregated speakers 27 followed by speakers 35, 36 of display device 108. Next, speakers 37, 38 of display device 110 may be placed in the array of aggregated speakers 27. The last speakers may be speakers 39, 40 of display device 112. As such, the aggregated speakers 27 may include all of the speakers in communication with the computer device 102 placed in an order.

In addition, speaker array 26 may store an associated between each speaker 33, 34, 35, 36, 37, 38, 39, 40 and the corresponding speaker location information 22. Speaker array 26 may be dynamically updated with any changes in speaker location information 22 and/or changes in the total number of speakers 20 (FIG. 1) in system 100 (FIG. 1). For example, if display devices 106, 108, 110, 112 are rotated to a different orientation, speaker array 26 may be updated with the new speaker location information 22 in response to the rotation. The speaker array 26 may be used to select a subset of speakers from the aggregated speakers 27 located nearby the application 10 (FIG. 1) to receive the audio data 12 (FIG. 1) for application 10.

Figure 3:
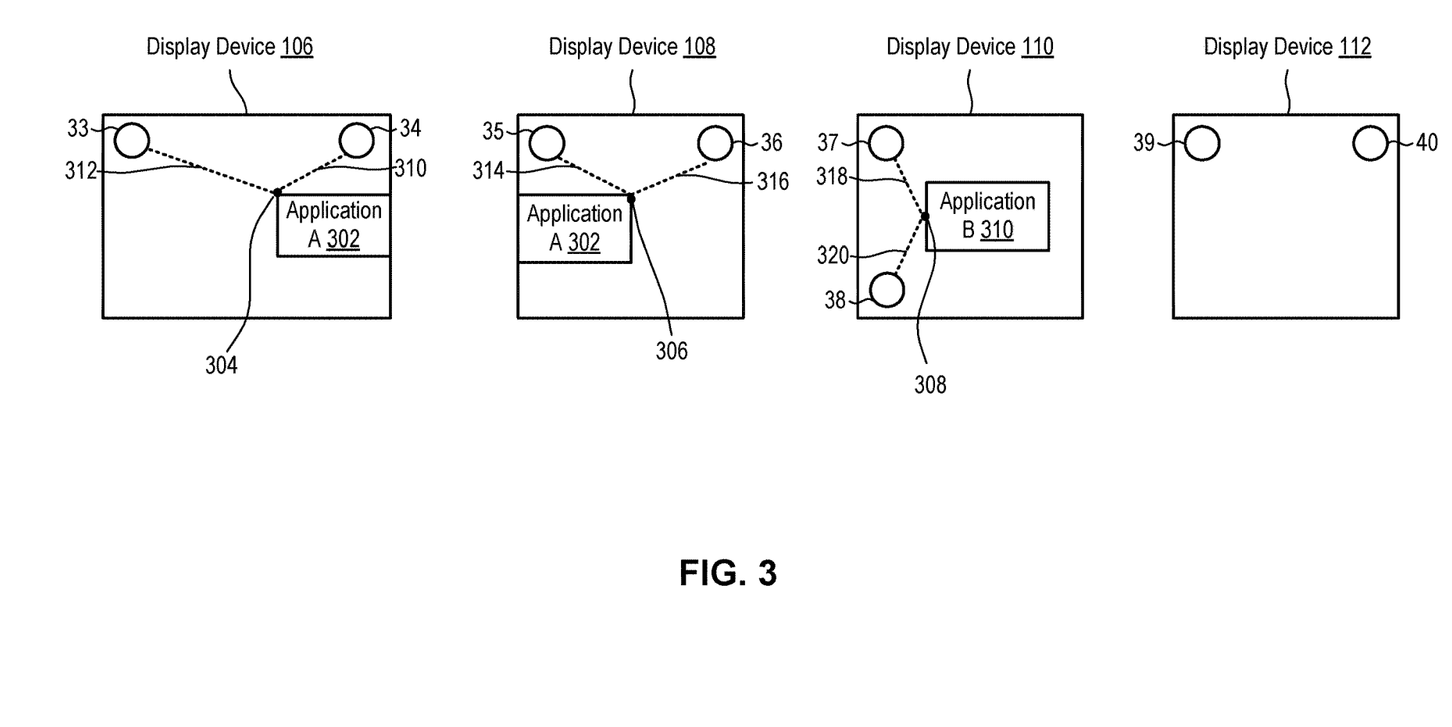
FIG. 3 is an example of selecting speakers to output audio data for two applications located on a plurality of display devices in accordance with an implementation of the present disclosure.

Referring now to FIG. 3, illustrated is an example of selecting speakers to output audio data for two applications, Application A 302 and Application B 310, located on a plurality of display devices 106, 108, 110. The example may be discussed below with reference to the architecture of FIG. 1.

Application A 302 may be open on both display device 106 and display device 108. The application location information 16 for Application A 302 may indicate that application A 302 is located on both display device 106 and display device 108. In addition, the application location information 16 for Application A 302 may include one or more coordinates 304 that indicate a current location 19 of Application A 302 on display device 106 and one or more coordinates 306 that indicate a current location 19 of Application A 302 on display device 108.

Speaker 34 of display device 106 and speakers 35, 36 of display device 108 may be selected by audio stack 24 to output any audio data 12 for Application A 302. Audio stack 24 may receive the application location information 16 for Application A 302 and may use the application location information 16 to determine that Application A is on display device 106. For example, audio stack 24 may use the speaker array 26 to identify that speakers 33, 34 are located on display device 106 and may use the speaker array 26 to access the corresponding speaker location information 22 for speakers 33, 34.

Audio stack 24 may use the speaker location information 22 for speakers 33, 34 to determine a distance 310 of speaker 34 to the current location 19 of Application A 302 on display device 106 and a distance 312 of speaker 34 to the current location 19 of Application A 302 on display device 106. Audio stack 24 may compare distance 310 to distance 312 and may determine that distance 310 of speaker 34 is closer to the current location 19 of Application A 302 relative to distance 312 of speaker 33. Audio stack 24 may select speaker 34 of display device 106 to output any audio data 12 for Application A 302 in response to the comparison of distances 310, 312. As such, audio stack 24 may transmit audio data 12 for Application A 302 to speaker 34 for output, and speaker 33 may not receive audio data 12 for Application A 302.

In addition, audio stack 24 may use the application location information 16 to determine that Application A is also located on display device 108. Audio stack 24 may use the speaker array 26 to determine that speakers 35, 36 are located on display device 108 and may use the speaker array 26 to access the corresponding speaker location information 22 for speakers 35, 36. Audio stack 24 may use the speaker location information 22 to determine a distance 316 for speaker 36 to the current location 19 of Application A 302 on display device 108 and a distance 314 for speaker 35 to the current location 19 of Application 302 on display device 108. Audio stack 24 may compare the distance 314 to distance 316 and may determine that distance 314 and distance 316 are a similar distance from the current location 19 of Application A 302. As such, audio stack 24 may select both speakers 35, 36 to output any audio data 12 for Application A 302 in response to the comparison of distances 314, 316. Audio stack 24 may transmit audio data 12 for Application A 302 to speakers 35, 36 for output.

In addition, Application B 310 may be open on display device 110. The application location information 16 for Application B 310 may indicate that Application B 310 is located on display device 110. In addition, the application location information 16 for Application B 310 may include one or more coordinates 320 that indicate a current location 19 of Application B 310 on display device 110.

Audio stack 24 may receive the application location information 16 for Application B 310 and may use the application location information 16 to determine that Application B 310 is on display device 110. Audio stack 24 may use the speaker array 26 to identify that speakers 37, 38 are located on display device 110 and audio stack 24 may use the speaker array 26 to access the corresponding speaker location information 22 for speakers 37, 38.

Audio stack 24 may use the speaker location information 22 for speakers 37, 38 to determine a distance 318 of speaker 37 to the current location 19 of Application B 310 and a distance 320 of speaker 38 to the current location 19 of Application B 310. Audio stack 24 may compare distance 318 to distance 320 and may determine that distance 318 and distance 320 are a similar distance from the current location 19 of Application B 310. As such, audio stack 24 may select both speakers 37, 38 to output any audio data 12 for Application B 310 in response to the comparison of distances 318, 320. Audio stack 24 may transmit audio data 12 for Application B 310 to speakers 37, 38 for output.

Audio stack 24 may determine that display device 112 does not have an application 10 currently open, and audio stack 24 may not transmit audio data 12 to speakers 39, 40 of display device 112.

As such, the current location 19 of Application A 302 and Application B 310 may be used to select the speakers to output the audio data 12 for Application A 302 and Application B 310.

Figure 4:
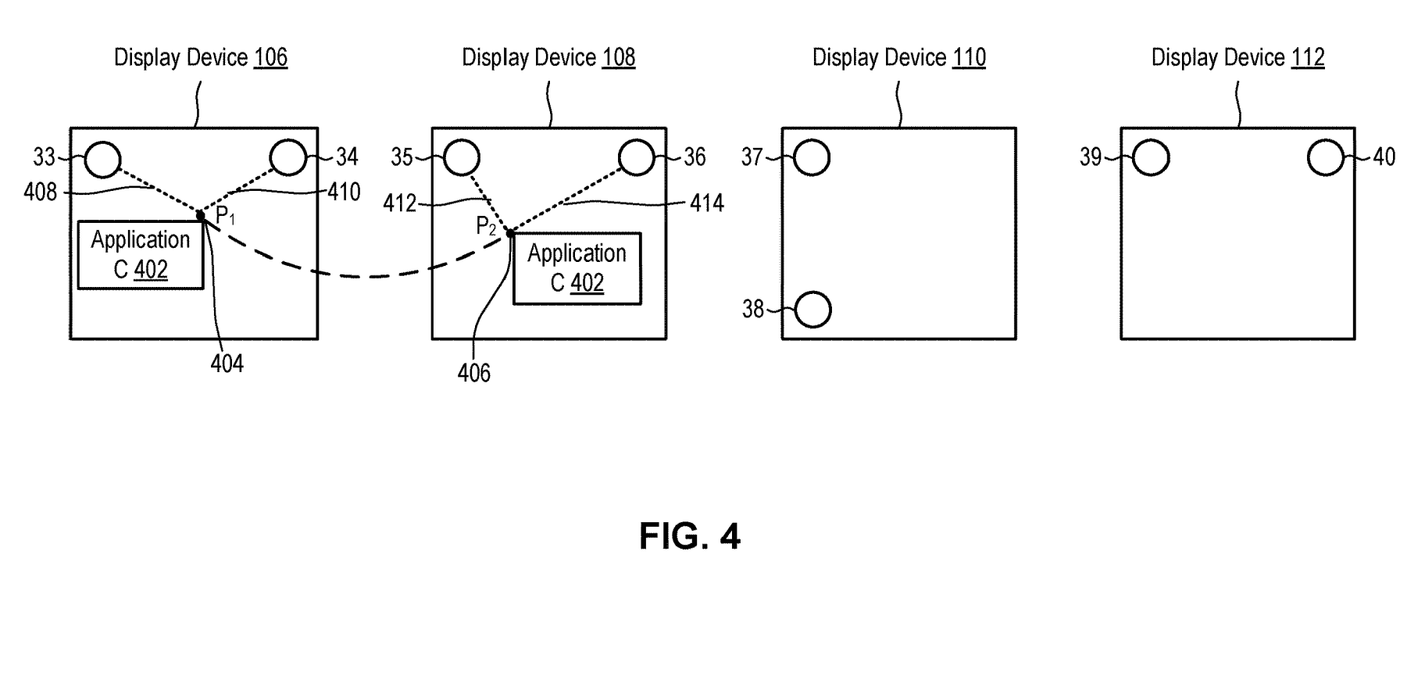
FIG. 4 is an example of panning audio to a new set of speakers when an application moves to a new location in accordance with an implementation of the present disclosure.

Referring now to FIG. 4, an example of panning audio to a new set of speakers 31 (FIG. 1) when Application C 402 moves from a current location 19 (FIG. 1) to a new location 23 (FIG. 1) is illustrated. The example may be discussed below with reference to the architecture of FIG. 1.

Application C 402 may be open on display device 106. The application location information 16 for Application C 402 may indicate that Application C 402 is located on display device 106. In addition, the application location information 16 for Application C 402 may include one or more coordinates $P_1$ 404 that indicate a current location 19 of Application C 404 on display device 106.

Audio stack 24 may receive the application location information 16 for Application C 310 and may use the application location information 16 and the speaker array 26 to identify that speakers 33, 34 are located on display device 106. Audio stack 24 may use the speaker location information 22 for speakers 33, 34 to determine a distance 408 of speaker 33 to the current location 19 of Application C 402 and a distance 410 of speaker 34 to the current location 19 of Application C 402. Audio stack 24 may compare distance 408 to the current location 19 of Application C 402 and may compare distance 410 to the current location 19 of Application C 402. Audio stack 24 may determine that distance 408 and distance 410 are within a predetermined radius of the current location 19 of Application C 402. As such, audio stack 24 may select both speakers 33, 44 for outputting the audio data 12. In addition, audio stack 24 may apply a same weight 28 for outputting audio data 12 to both speakers 33, 34 when outputting any audio data 12 for Application C 402 in response to the comparison of distances 408, 410 to the current location 19. For example, weight 28 may control an amount of volume at which audio data 12 may be output from speakers 33, 34. Since speakers 33, 34 may have the same weight 28, the volume of the audio data 12 output from speakers 33, 34 may be the same. Audio stack 24 may transmit audio data 12 for Application C 402, along with the weight 28 to speakers 33, 34 for output.

A user may move Application C 402 from the current location 19 on display device 106 to a new location 23 on display device 108. Audio stack 24 may receive updated application location information 16 for Application C 402 with the new location 23. For example, one or more coordinates $P_2$ 406 may indicate the new location 23 of Application C 402 on display device 108.

As Application C moves 402 from the current location 19 (e.g., coordinate $P_1$ 404) on display device 106 to the new location (e.g., coordinates $P_2$ 406) on display device 108, audio stack 24 may pan the audio data 12 to follow the movement of Application C 402. For example, audio stack 24 may determine that speakers 33, 34 may be a further distance 408, 410 from Application C 402 and may start to reduce the weight 28 of audio data 12 sent to speakers 33, 34. As the weight 28 decreases, the volume of output from speakers 33, 34 may also decrease. Audio stack 24 may reduce the weight 28 to zero when Application C 402 is removed from display device 106. As such, speakers 33, 34 may no longer output audio data 12 for Application C 402 when Application C 402 moves to display device 108.

Audio stack 24 may receive the updated application location information 16 for Application C 402 and may determine that the new location 23 for Application C 402 is on display device 108. One or more coordinates $P_2$ 406 may indicate where Application C 402 is located on display device 108. Audio stack 24 may use the speaker array 26 to identify that speakers 35, 36 are located on display device 108. As Application C 402 moves to display device 108, audio stack 24 may start outputting audio data 12 for Application C 402 via speakers 35, 36 of display device 108.

Audio stack 24 may use the speaker location information 22 for speakers 35, 36 to determine a distance 412 of speaker 35 to the new location 23 of Application C 402 and a distance 414 of speaker 36 to the new location 23 of Application C 402. Audio stack 24 may compare distance 412 to distance 412 and may determine that distance 412 is closer to the new location 23 of Application C 402 relative to distance 414. Audio stack 24 may apply a higher weight 28 for outputting audio data 12 to speaker 35 relative to the weight 28 provided to speaker 36 in response to the comparison of distances 412, 414. As such, the volume of the audio data 12 output from speaker 35 may be higher relative to the volume of the audio data 12 output from speaker 36. Audio stack 24 may transmit audio data 12 for Application C 410, along with the weight 28 to speakers 35, 36 for output.

In addition, audio stack 24 may not transmit audio data 12 for Application C 402 to display device 110 and display device 112 since Application C 402 is not located on display devices 110, 112. Alternatively, audio stack 24 may transmit audio data 12 with a weigh 28 of zero for Application C 402 to display device 110 and display device 112 so that display devices 110, 112 may not output audio data 12 since Application C 402 is not located on display devices 110, 112. As such, speakers 37, 38, 39, 40 may not output audio data 12 for Application C 402.

As applications move to a new location, the audio output for the applications may transition smoothly from a set of speakers physically located nearby the current location of the applications to a new set of speakers physically located nearby the new location so that the audio output may follow the movement of the applications.

Figure 5:
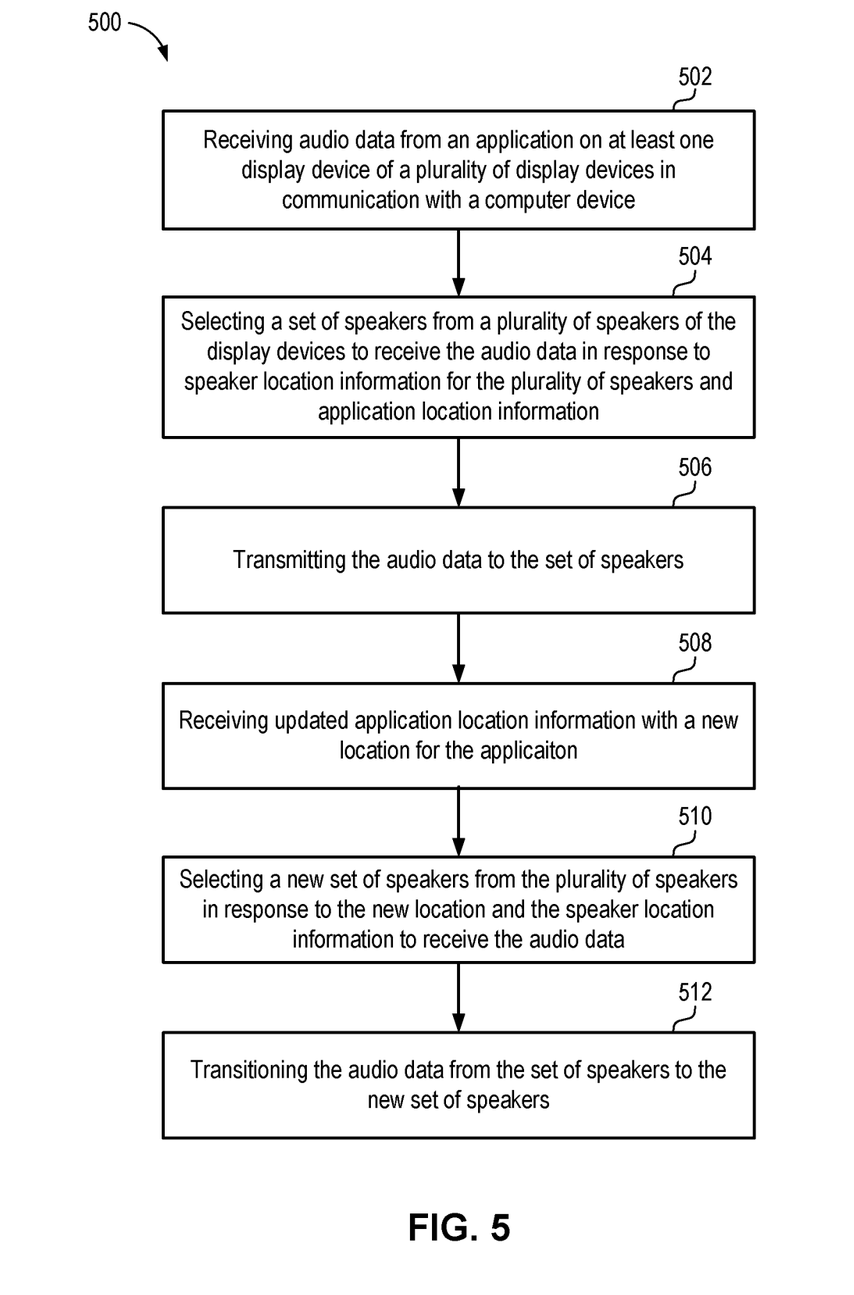
FIG. 5 is an example method flow for panning audio across a plurality of speakers in accordance with an implementation of the present disclosure.

Referring now to FIG. 5, an example method 500 may be used by computer device 102 (FIG. 1) for panning audio across a plurality of speakers 33, 34, 35, 36, 37, 38, 39, 40 (FIG. 1). The actions of method 500 may be discussed below with reference to the architecture of FIG. 1.

At 502, method 500 may include receiving audio data from an application on at least one display device of a plurality of display devices in communication with a computer device. An audio stack 24 may receive audio data 12 from one or more applications 10 and may select speakers 30 on one or more display devices 106, 108, 110, 112 to output the audio data 12. The plurality of display devices 106, 108, 110, 112 may be combined together and represented as a single audio endpoint so that applications 10 may be unaware of the plurality of display devices 106, 108, 110, 112 in communication with computer device 102. Applications 10 executing on computer device 102 may be used on any one of display devices 106, 108, 110, 112. Applications 10 may be spread across multiple display devices 106, 108, 110, 112 without being constrained to a single display device 106, 108, 110, 112. As such, a whole new dimension to collaborative and productive work may be created.

At 504, method 500 may include selecting a set of speakers from a plurality of speakers of the display devices to receive the audio data in response to speaker location information for the plurality of speakers and application location information. Audio stack 24 may receive information indicating a number of applications 10 open on display devices 106, 108, 110, 112 and the corresponding application location information 16 for each application 10.

The application location information 16 may indicate one or more display devices 106, 108, 110, 112 where application 10 may be currently located. In addition, on a particular display device 106, 108, 110, 112, there may be multiple windows and/or virtual panels that may correspond to one or more applications 10. For example, applications 10 may have a graphical user interface (UI) that corresponds to a window on a display device 106, 108, 110, 112. The application location information 16 may also include coordinates from, for example, a Cartesian coordinate system, that provide a pixel position of the current location 19 of applications 10 on the display devices 106, 108, 110, 112. As such, the application location information 16 may indicate a window and/or virtual panel on display devices 106, 108, 110, 112 where applications 10 may be located and may also provide a pixel position of a current location 19 of applications 10 on display devices 106, 108, 110, 112.

In addition, audio stack 24 may receive display device information including, but not limited to, the total number of display devices 18 in communication with computer device 102, the total number of speakers 20 in the system, the speaker location information 22, and any device sequencing 21 information. For example, the speaker location information 22 may identify a physical location of the speakers 33, 34, 35, 36, 37, 38, 39, 40 that may correspond to a static orientation of the speakers 33, 34, 35, 36, 37, 38, 39, 40 on each of the display devices 106, 108, 110, 112. As such, the speaker location information 22 may indicate which display device 106, 108, 110, 112 speakers 33, 34, 35, 36, 37, 38, 39, 40 are physically located on and/or a certain area of such location (e.g., top (left/center/right), bottom (left/center/right), middle (left/center/right)).

Audio stack 24 may maintain a relationship between the total number of speakers 20 in the system and the corresponding speaker location information 22. For example, audio stack 24 may create a speaker array 26 that combines the speakers 33, 34, 35, 36, 37, 38, 39, 40 from each display device 106, 108, 110, 112 using an order from the device sequencing 21 information into an array of aggregated speakers 27. The array of aggregated speakers 27 may be the total number of speakers 20 in the system 100 with an order applied using the device sequencing 21 information.

Audio stack 24 may use a combination of the application location information 16 and the speaker location information 22 in selecting the speakers 30 to receive the audio data 12. Audio stack 24 may use the speaker array 26 to select a set of speakers from the aggregated speakers 27 located nearby the current location 19 of application 10. The set of speakers may be located nearby the current location 19 of application 10 when the physical location of the set of speakers are on the same display device 106, 108, 110, 112 as application 10. In addition, the set of speakers may be located nearby the current location 19 of application 10 when a distance from the physical location of each speaker of the set of speakers is within a predefined radius of application 10. For example, the set of selected speakers 30 may be within a predefined radius of application 10.

The selected speakers 30 may be a subset of the total number of speakers 20. In addition, the selected speakers 30 may be the total number of speakers 20. For example, a user may expand an application 10 to cover all of the display devices 106, 108, 110, 112. Audio stack 24 may determine that all of the speakers 33, 34, 35, 36, 37, 38, 39, 40 are located nearby application 10. As such, the selected speakers 30 may include all of the speakers in the system.

In addition, may also use other auxiliary information 29 to select one or more speakers 30 of display devices 106, 108, 110, 112 to output the audio data 12 for applications 10. Auxiliary information 29 may include, but is not limited to, user location information, changes in speaker location information 22 (e.g., when a display device is rotated), and/or any other triggers that may determine a direction of the audio output. For example, the selected speakers 30 may be closest to the user location instead of the application location so that the audio may be output close to the user.

At 506, method 500 may include transmitting the audio data to the set of speakers. Audio stack 24 may transmit audio data 12 for application 10 to the selected set of speakers 30 for output. In addition, audio stack 24 may transmit a weight 28 to the selected speakers 30. Audio stack 24 may apply a weight 28 to determine an amount of audio data 12 to output via a corresponding selected speaker 30. The weight 28 may be determined in response to a distance a speaker may be from the current location 19 of application 10. A speaker close in distance to the current location 19 of application 10 may receive a higher weight 28 relative to a speaker located further away from the current location 19 of application 10. For example, the weight 28 may indicate an amount of volume to output from the selected speakers 30, where a lower number may result in a lower volume and a higher number may result in a higher volume.

At 508, method 500 may include receiving updated application location information with a new location for the application. For example, a user may drag and/or expand the window size of application 10 so that application 10 may span across multiple display devices 106, 108, 110, 112 and/or move to a new location 23 (e.g., a different location on the current display device and/or to a different display device). As one or more applications 10 change locations to a new location 23, application location manager 17 may track the movement of the application(s) 10 and may update the application location information 16 in response to the changes in location. Audio stack 24 may receive the updated application location information 16 with the new location 23 for application 10. The updated application location information 16 may identify one or more display devices 106, 108, 110, 112 for the new location 23 of application 10. In addition, the updated application location information 16 may include coordinates of a pixel position of the application on the one or more display devices 106, 108, 110, 112.

Audio stack 24 may also receive updated auxiliary information 29. For example, when a user moves to a different location (e.g., to a different room or to a different area in the same room), audio stack 24 may receive the updated auxiliary information 29 for the user location. Another example may include, if a user rotates display devices 106, 108, 110, 112 to a different direction, audio stack 24 may receive the updated speaker location information 22.

At 510, method 500 may include selecting a new set of speakers from the plurality of speakers in response to the new location and the speaker location information to receive the audio data. Audio stack 24 may use the speaker array 26 to select a new set of speakers 31 from the aggregated speakers 27 located nearby the new location 23 of application 10. For example, audio stack 24 may use the application location information 16 to identify one or more display devices 106, 108, 110, 112 for the new location 23 of application 10. Audio stack 24 may use the speaker array 26 to compare the speaker location information 22 for each of the speakers 33, 34, 35, 36, 37, 38, 39, 40 on the identified display devices 106, 108, 110, 112 to determine the set of new speakers 31 nearby the new location 23 of application 10.

The new set of speakers 31 may be located nearby the new location 23 of application 10 when the physical location of the new set of speakers 31 are located on the same display device 106, 108, 110, 112 as application 10. In addition, the new set of speakers 31 may be located nearby the new location 23 of application 10 when a distance from the physical location of each speaker of the new set of speakers 31 is within a predefined radius of application 10.

Audio stack 24 may also use the updated auxiliary information 29 to select the new set of speakers 31. For example, when a user moves to a different room, audio stack 24 may use the speaker array 26 to compare the speaker location information 22 to the user location information to determine the set of new speakers 31 in the same room as the user. Another example may include audio stack 24 using the speaker array 26 to select a new set of speakers 31 that have a shortest distance to the user location relative to other speakers.

At 512, method 500 may include transitioning the audio data from the set of speakers to the new set of speakers. As application 10 may move to a new location 23, the audio stack 24 may pan the audio data 12 to the new set of speakers 31 nearby the new location 23 for application 10. For example, audio stack 24 may lower the weight 28 applied to the selected speakers 30 near the current location 19 of application 10 so that a volume of audio data 12 output by the set of selected speakers 30 may be reduced. In addition, audio stack 24 may increase the weight 28 applied to the new set of speakers 31 near the new location 23 so that the volume of audio data 12 output by the new set of speakers 31 near the new location 23 of application 10 may increase. As such, audio stack 24 may ensure that the output of the audio data 12 follows the movement of application 10 to the new location 23.

Audio stack 24 may intelligently pan audio to a speaker configuration as applications move locations by making decisions internally where to send audio so that a user and/or application does not have to make any of the decisions. As such, as applications may spread across multiple displays, bringing a whole new dimension to collaborative and productive work, the audio for the applications may pan to different speaker configurations following the movement of the applications.

Figure 6:
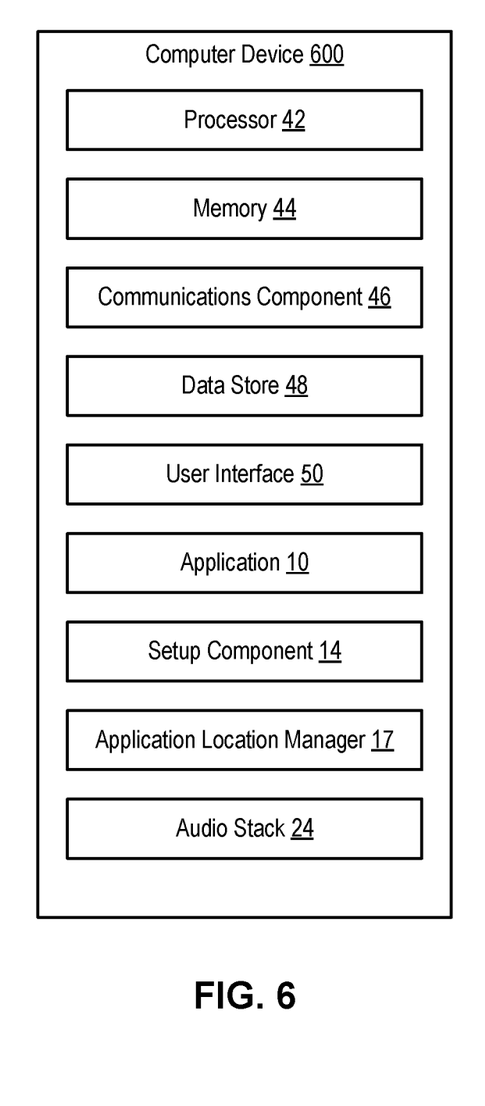
FIG. 6 is a schematic block diagram of an example device in accordance with an implementation of the present disclosure.

Referring now to FIG. 6 an example computer 600 that may be configured as computer device 102 in accordance with an implementation includes additional component details as compared to FIG. 1. In one example, computer 600 may include processor 42 for carrying out processing functions associated with one or more of components and functions described herein. Processor 42 can include a single or multiple set of processors or multi-core processors. Moreover, processor 42 can be implemented as an integrated processing system and/or a distributed processing system.

Computer 600 may further include memory 44, such as for storing local versions of applications being executed by processor 42. Memory 44 can include a type of memory usable by a computer, such as random access memory (RAM), read only memory (ROM), tapes, magnetic discs, optical discs, volatile memory, non-volatile memory, and any combination thereof. Additionally, processor 56 may include and execute operating system 111 (FIG. 1).

Further, computer 600 may include a communications component 46 that provides for establishing and maintaining communications with one or more parties utilizing hardware, software, and services as described herein. Communications component 46 may carry communications between components on computer device 102, as well as between computer device 102 and external devices, such as devices located across a communications network and/or devices serially or locally connected to computer device 102. For example, communications component 46 may include one or more buses, and may further include transmit chain components and receive chain components associated with a transmitter and receiver, respectively, operable for interfacing with external devices.

Additionally, computer 600 may include a data store 48, which can be any suitable combination of hardware and/or software, that provides for mass storage of information, databases, and programs employed in connection with implementations described herein. For example, data store 48 may be a data repository for applications 10, setup component 14, application location manager 17, and/or audio stack 24.

Computer 600 may also include a user interface component 50 operable to receive inputs from a user of computer device 102 and further operable to generate outputs for presentation to the user. User interface component 50 may include one or more input devices, including but not limited to a keyboard, a number pad, a mouse, display (e.g., which may be a touch-sensitive display), a navigation key, a function key, a microphone, a voice recognition component, any other mechanism capable of receiving an input from a user, or any combination thereof. Further, user interface component 50 may include one or more output devices, including but not limited to a display, a speaker, a haptic feedback mechanism, a printer, any other mechanism capable of presenting an output to a user, or any combination thereof.

In an implementation, user interface component 50 may transmit and/or receive messages corresponding to the operation of applications 10, setup component 14, application location manager 17, and/or audio stack 24. In addition, processor 42 executes applications 10, setup component 14, application location manager 17, and/or audio stack 24, and memory 44 or data store 48 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory to store data and instructions;
at least one processor configured to communicate with the memory; and
an operating system configured to communicate with the memory and the at least one processor, wherein the operating system is operable to:
receive audio data from an application open on at least one display device of a plurality of display devices in communication with the computer device;
select a set of speakers from a plurality of speakers of the plurality of display devices to receive the audio data in response to speaker location information for the plurality of speakers and application location information with a current location for the application;
receive updated application location information with a new location for the application;
select a new set of speakers from the plurality of speakers to receive the audio data in response to the new location for the application and the speaker location information; and
transition the audio data from the set of speakers to the new set of speakers.

2. The computer device of claim 1, wherein the application location information identifies the at least one display device where the application is located and the current location identifies a location of the application on the at least one display device.

3. The computer device of claim 1, wherein the speaker location information identifies a static orientation of each speaker of the plurality of speakers on the plurality of display devices.

4. The computer device of claim 1, wherein the operating system is further operable to:
determine a weight to apply to each speaker of the set of speakers and each speaker of the new set of speakers, wherein the weight controls a volume of output for the audio data.

5. The computer device of claim 4, wherein the weight is determined in response to at least one of a distance from a static orientation of each speaker of the set of speakers to the current location of the application or in response to a distance from a static orientation of each speaker of the new set of speakers to the new location of the application.

6. The computer device of claim 4, wherein the operating system is further operable to transition the audio data from the set of speakers to the new set of speakers by reducing the weight for each speaker of the set of speakers and increasing the weight for each speaker of the new set of speakers.

7. The computer device of claim 1, wherein the operating system is further operable to select the set of speakers in response to the speaker location information for the set of speakers indicating at least one of the set of speakers are located on the at least one display device or the set of speakers are within a predetermined radius of the current location of the application.

8. The computer device of claim 1, wherein the new location is on a different display device of the plurality of display devices and the new set of speakers are located on the different display device.

9. The computer device of claim 1, wherein the set of speakers and the new set of speakers output the audio data.

10. The computer device of claim 1, wherein the operating system is further operable to select the set of speakers from the plurality of speakers in response to auxiliary information.

11. A method for panning audio across a plurality of speakers, comprising:
receiving, at an operating system executing on a computer device, audio data from an application open on at least one display device of a plurality of display devices in communication with a computer device;
selecting a set of speakers from the plurality of speakers of the plurality of display devices to receive the audio data in response to speaker location information for the plurality of speakers and application location information with a current location for the application;
receiving updated application location information with a new location for the application;
selecting a new set of speakers from the plurality of speakers to receive the audio data in response to the new location for the application and the speaker location information; and
transitioning the audio data from the set of speakers to the new set of speakers.

12. The method of claim 11, wherein the application location information identifies the at least one display device where the application is located and the current location identifies a location of the application on the at least one display device.

13. The method of claim 11, wherein the speaker location information identifies a static orientation of each speaker of the plurality of speakers on the plurality of display devices.

14. The method of claim 11, wherein the method further comprises:
determining a weight to apply to each speaker of the set of speakers and each speaker of the new set of speakers, wherein the weight controls a volume of output for the audio data.

15. The method of claim 14, wherein the weight is determined in response to at least one of a distance from a static orientation of each speaker of the set of speakers to the current location of the application or in response to a distance from a static orientation of each speaker of the new set of speakers to the new location of the application.

16. The method of claim 14, wherein the audio data is transitioned from the set of speakers to the new set of speakers by reducing the weight for each speaker of the set of speakers and increasing the weight for each speaker of the new set of speakers.

17. The method of claim 11, wherein the set of speakers is selected in response to the speaker location information for the set of speakers indicating at least one of the set of speakers are located on the at least one display device or the set of speakers are within a predetermined radius of the current location of the application.

18. The method of claim 11, wherein the new location is on a different display device of the plurality of display devices and the new set of speakers are located on the different display device.

19. The method of claim 11, wherein the new set of speakers from the plurality of speakers are selected in response to updated auxiliary information.

20. A computer-readable medium storing instructions executable by a computer device, comprising:
at least one instruction for causing the computer device to receive audio data from an application open on at least one display device of a plurality of display devices in communication with the computer device;
at least one instruction for causing the computer device to select a set of speakers from a plurality of speakers of the plurality of display devices to receive the audio data in response to speaker location information for the plurality of speakers and application location information with a current location for the application;
at least one instruction for causing the computer device to receive updated application location information with a new location for the application;
at least one instruction for causing the computer device to select a new set of speakers from the plurality of speakers to receive the audio data in response to the new location for the application and the speaker location information; and
at least one instruction for causing the computer device to transition the audio data from the set of speakers to the new set of speakers.

* * * * *